United States Patent
Sezerman et al.

(10) Patent No.: US 7,058,275 B2
(45) Date of Patent: Jun. 6, 2006

(54) STRESS RELIEF IN FIBRE OPTIC ARRAYS

(75) Inventors: Omur Sezerman, Kanata (CA); Nasser Y. Aghdam, Ottawa (CA); Thoba Nguyen, Ottawa (CA); H. Wayne Rock, Gloucester (CA)

(73) Assignee: Oz Optics Limited, Carp (CA)

( * ) Notice: Subject to any disclaimer, the term of this patent is extended or adjusted under 35 U.S.C. 154(b) by 0 days.

(21) Appl. No.: 11/057,381

(22) Filed: Feb. 15, 2005

(65) Prior Publication Data

US 2005/0213922 A1 Sep. 29, 2005

Related U.S. Application Data

(63) Continuation of application No. PCT/CA02/001268, filed on Aug. 16, 2002.

(51) Int. Cl.
*G02B 6/00* (2006.01)

(52) U.S. Cl. .................. 385/137; 385/114; 385/115

(58) Field of Classification Search ............. 385/114, 385/115, 137
See application file for complete search history.

(56) References Cited

U.S. PATENT DOCUMENTS 4,784,457 A 11/1988 Finzel

2002/0081084 A1 * 6/2002 Matsumoto et al. ........ 385/120

FOREIGN PATENT DOCUMENTS

JP 03 155503 * 10/1991
JP 06 222246 * 11/1994

* cited by examiner

*Primary Examiner*—John D. Lee
*Assistant Examiner*—James D. Stein
(74) *Attorney, Agent, or Firm*—Jones,Tullar&Cooper, P.C.

(57) ABSTRACT

A mechanism for achieving symmetrical stress loads on operating optical fibers (16) held in fiber optic arrays includes, in one embodiment, the provision of a pair of non-operating or dummy fibers(26), each located outboard of the outermost or curb fibers(16") of the array. All of the fibers, whether operating or dummy, are held in corresponding grooves (18, 24) in a substrate (12). A cover plate (14) may be positioned thereover while a low stress glue or potting compound (22) is introduced or applied so as to completely encapsulate the fibers. The glue or potting compound will symmetrically surround all of the operating fibers whereby not only any inboard operating fibers (16'), but also the outboard operating curb fibers (16"), are symmetrically encapsulated. In this manner all of the operating fibers are subject to the same stresses and consequently will exhibit essentially the same polarization maintaining behavior. The invention is primarily beneficial with polarization-maintaining optical fibers, but will work effectively with other types of optical fibers as well, wherever stress are a concern.

10 Claims, 4 Drawing Sheets

STRESS RELIEF IN FIBRE OPTIC ARRAYS

CROSS REFERENCE TO RELATED APPLICATIONS

This application is a continuation under 35 U.S.C. § 120 and 365(c) of International Application No. PCT/CA2002/001268, which was filed on Aug. 16, 2002 and designates the Untied States.

BACKGROUND OF THE INVENTION

The present invention relates in general to the relief of asymmetrical stresses in fibre optic arrays, and in particular to the relief of asymmetrical stresses on polarizing (PZ) or polarization-maintaining (PM) fibres supported in grooved assemblies.

Polarization maintaining (PM) fibres are fibres that have been especially developed to maintain polarization of light polarized along one of the principal axes of polarization of the fibre and transmitted therealong under adverse conditions. With such fibres, light polarized along one of the principal axes travels at a different rate than light polarized orthogonal to that axis. In particular, PM fibres will maintain polarization under most stresses applied externally to the fibre in use. For example, a one metre long connectorized patchcord constructed with PM fibre can maintain polarization to at least 30 dB at a wavelength of 1550 nm. The polarization-extinction ratio of PM fibres can be degraded by microbending or by stresses within the connectors used or by external optical components that do not maintain polarization properly. Special termination procedures, low stress glues, and top quality lenses and optics must be used to minimize stresses introduced into the PM fibres so as to achieve and maintain high extinction ratios.

One common type of connector that can make use of PM fibres is a v-groove assembly in which one or more PM fibres are arranged side-by-side, with each fibre located in its own v-groove of a substrate member. Typically, although not always, a cover plate is positioned over the array of fibres and a low stress glue or potting compound compatible with the fibres and the substrate is provided, with the glue or potting compound surrounding or encapsulating the fibres and substantially filling in most voids therearound. After the glue or potting compound has cured and the end face has been prepared the assembly is ready for use.

One problem with v-groove assemblies has been noted, that being the fact that the outboard or curb fibres of each array within the assembly appear to exhibit somewhat degraded extinction ratios in comparison to any remaining inboard fibres, namely those between the two curb fibres. It would appear that such inboard fibres all have a substantially symmetrical surrounding volume of glue or potting compound whereas curb fibres have an asymmetrical surrounding volume of glue or potting compound. This is the result of the flow properties of the glue or potting compound when it is applied and then cured, the glue or potting compound not being constrained adjacent to curb fibres to the same extent as it is between those curb fibres. The asymmetrical constraint results in an asymmetrical distribution of the forces within the glue or potting compound and this in turn affects the distribution of stresses to which the fibres are subjected.

SUMMARY OF THE INVENTION

The present invention overcomes the problems associated with increased stress effects, including decreased polarization-extinction ratios, associated with curb fibres in a PM or PZ v-groove assembly by bringing those curb fibres into the same symmetrical arrangement as inboard fibres in an array. This can be achieved by forming additional v-grooves in the substrate, at least one outboard of each curb fibre, and by placing a dummy, constraining, or non-operating fibre of substantially the same diameter as the fibres utilized in the array in each of these additional v-grooves. Thus, when the low stress glue or potting compound is applied all of the operating fibres of the array will be symmetrically encapsulated in the glue or potting compound and it will only be the outermost non-operating fibres which will be subjected to asymmetrical forces or stresses during use of the assembly. All of the operating fibres will be symmetrically encapsulated and each of those fibres will be substantially identically stressed after manufacture of the assembly to minimize degradation of the polarization-extinction ratios, as desired.

The invention will work with assemblies that use different fibre-holding grooves that are not v-shaped. The grooves can be of any other arbitrary geometry, including elliptical, circular, or rectangular, as long as the fibres will be properly held therein. The principle of the present invention does not depend on the nature of the groove; however it was developed in association with v-grooves as they are the most common type of groove in use with such PM or PZ assemblies.

Since the main thrust of the present invention is to achieve symmetry with respect to the encapsulation of the operating fibres of the array, it is possible that such symmetry could be achieved by means other than the use of dummy fibres. For example, a short wall or dam parallel to the grooves and lying outboard of each curb fibre could be used to contain the glue or potting compound and thus ensure that each curb fibre is surrounded by the same volume of glue or potting compound as the inboard fibres, thereby achieving symmetrical stress characteristics for all fibres of the array.

In summary the present invention may be considered to provide in one embodiment a fibre optic assembly comprising: a substrate having an upper surface and a plurality of equally spaced apart parallel grooves therein opening to the upper surface; a plurality of optical fibres with each such fibre being located in a corresponding one of the grooves with a portion of each fibre projecting above the upper surface; and an encapsulating material encapsulating each of the fibres within its groove; the plurality of optical fibres including at least one operating inboard fibre having polarizing or polarization maintaining properties, a pair of operating curb fibres with one such curb fibre extending along each side of the at least one inboard fibre, and at least one pair of non-operating fibres with one such non-operating fibre extending alongside each of the curb fibres outboard thereof, whereby the non-operating fibres serve to contain the encapsulating material such that the encapsulating material symmetrically surrounds all of the operating fibres.

In another embodiment the present invention contemplates a fibre optic assembly comprising: a substrate having an upper surface and at least one groove therein opening to the upper surface; a plurality of parallel optical fibres located in the groove with a portion of each fibre projecting above the upper surface; the plurality of optical fibres including at least one operating inboard fibre having polarizing or polarization maintaining properties, a pair of operating curb fibres with one such curb fibre extending along each side of the at least one inboard fibre, and a pair of non-operating fibres with one such non-operating fibre located in the groove and extending alongside each of the curb fibres outboard thereof; and an encapsulating material encapsulating each of the fibres within the groove, whereby the non-operating fibres serve to contain the encapsulating material such that the encapsulating material symmetrically surrounds all of the operating fibres.

DESCRIPTION OF THE PREFERRED EMBODIMENT

Figure 1:
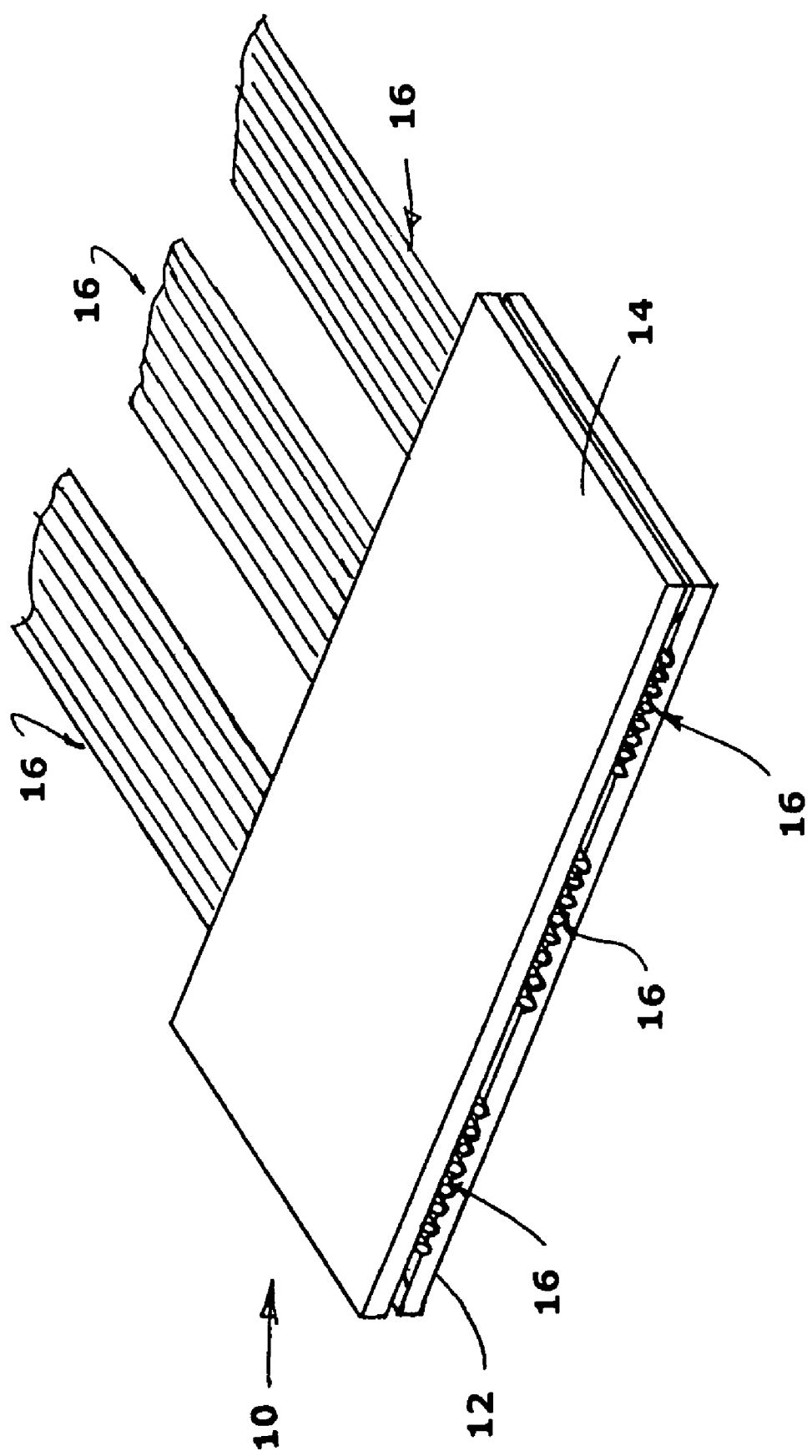
FIG. 1 shows an enlarged view of a prior art fibre optic v-groove assembly, illustrating how the fibres are held therein.

FIG. 1 shows a typical prior art 16 channel v-groove assembly 10 which includes a substrate 12, a cover plate 14 and three sets or arrays of PM fibres 16 held in the substrate 12. It is noted that in this example the fibres 16 are arranged in three sets or arrays of eight fibres each. Assemblies such as shown in FIG. 1 are available with any number of fibres contained therein, typical assemblies including arrays of 2, 3, 4, 8, 12, 16 . . . or 48 or more fibres. The number of fibres will depend of course on the particular application for which the assembly is to be used.

Figure 2:
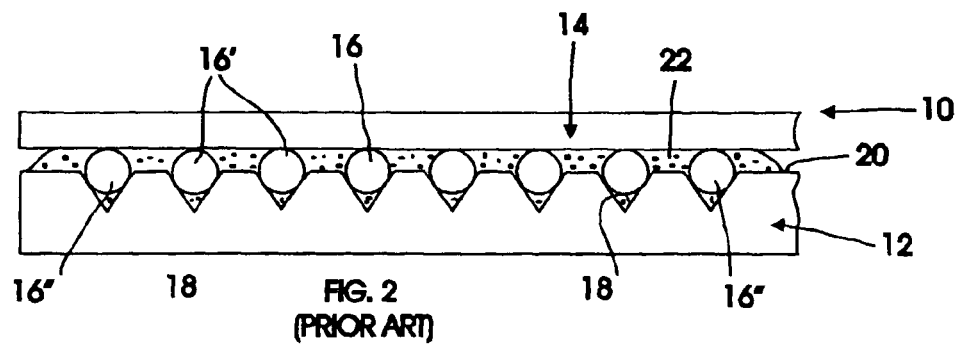
FIG. 2 is an enlarged end view of the prior art fibre optic v-groove assembly of FIG. 1.

FIG. 2 shows that the substrate 12 has a plurality of v-shaped grooves 18 therein equally spaced apart across the substrate and opening to the upper surface 20 thereof. In the version shown in FIG. 2 the v-grooves 18 are shown in a set of eight, corresponding to one of the sets or arrays of fibres shown in FIG. 1. It is seen that each groove 18 contains a fibre 16 and that each fibre projects slightly above the substrate surface 20. The cover plate 14 is positioned above the fibres 16 across the width of the substrate and may actually contact the fibres. A low stress glue or potting compound 22 introduced into the space defined between the cover plate 14 and the substrate 12 encapsulates the fibres and holds them firmly in their respective grooves, the glue or potting compound surrounding the fibres. Preferably the glue or potting compound will fill all voids around the fibres.

As seen in FIG. 2 all of the inboard fibres 16' are symmetrically surrounded by glue or potting compound relative to each other and hence each will experience essentially the same stresses. The outboard or curb fibres 16" however are not symmetrically surrounded by glue or potting compound, with the glue or potting compound trailing off to the sides of each array or set outboard of the curb fibres. Thus the outboard or curb fibres 16" are not subject to the same stresses as the inboard fibres 16' and this means that their polarization-extinction ratios may be degraded as compared to the inboard fibres 16'.

Figure 3:
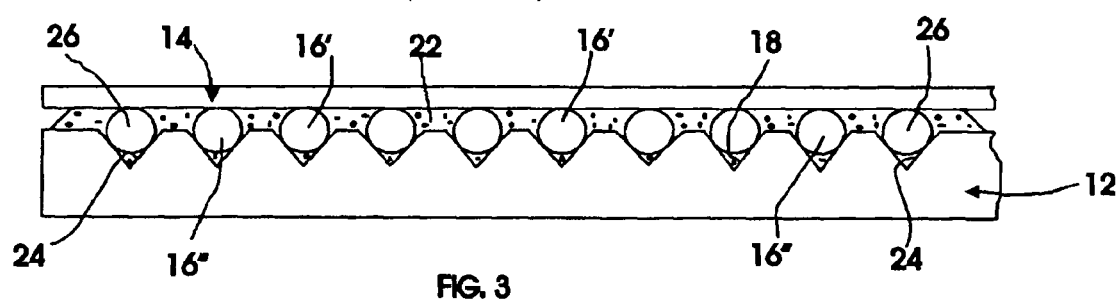
FIG. 3 is an enlarged end view of the fibre optic v-groove assembly of FIG. 1 with additional v-grooves and dummy fibres added thereto in accordance with the present invention.

FIG. 3 illustrates the manner in which the problem of the prior art is overcome with the present invention. Outboard of the curb fibres 16" there is provided a pair of additional v-grooves 24, one adjacent each curb fibre 16", at the same spacing as the v-grooves 18. Each additional v-groove 24 receives a non-operating or dummy fibre 26 of substantially the same diameter as the fibres 16. The cover plate 14 is positioned and the low stress glue or potting compound is introduced into the space defined between the cover plate 14 and the substrate 12. Now, the outboard or curb fibres 16" are encapsulated exactly the same as the inboard fibres 16' and they will exhibit similar polarization-extinction ratios as the inboard fibres, as desired. It becomes immaterial that the dummy fibres 26 are not symmetrically encapsulated as they play no part in the operation of the assembly.

The dummy fibres can be any type of fibre having substantially the same diameter as the operational fibres 16. One could use regular PM or PZ fibres, the same as the fibres 16, to ensure that the physical requirements are met; one could use PM or PZ "seconds", such as fibres that were rejected during product testing; or one could use other non-PM or -PZ fibres, being less expensive. Included in the term "dummy fibres" are non-fibre rods having the same diameter as the operating fibres. Depending on the particular application and conditions it might be desirable to have two or even more non-operating fibres positioned outboard of each of the curb fibres, thereby further distancing the operating fibres from the asymmetry created by the edges of the glue or potting compound.

Figure 4:
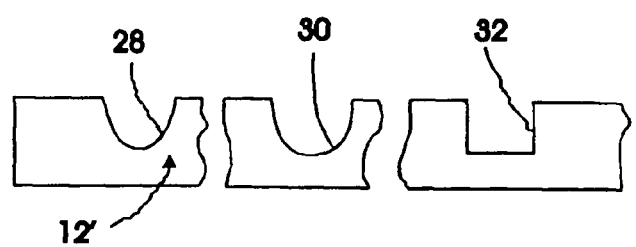
FIG. 4 shows enlarged end views of several different groove formations with which the present invention will work.
Figure 5:
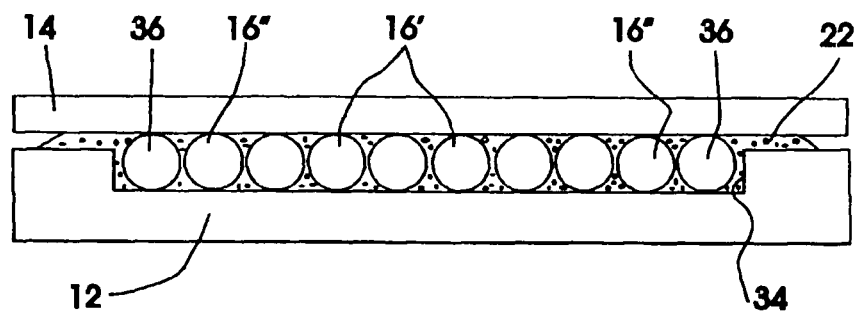
FIG. 5 shows an enlarged end view of a fibre optic assembly wherein the fibres are all contained within a single groove.

FIG. 4 shows in end view a substrate 12' having different forms of grooves with which the present invention could still be used. For example the substrate could be provided with elliptical grooves 28, circular grooves 30, or rectangular grooves 32. It is also conceivable that a plurality of operating fibres could be positioned within a single groove, such as a wide rectangular groove 34. In this case there would be a plurality of inboard operating fibres 16' and a pair of outboard curb fibres 16". In accordance with this invention the groove 34 would be widened to accommodate at least one non-operating fibre 36 outboard of each curb fibre 16" such that the glue or potting compound will symmetrically surround the operating fibres 16' and 16". This embodiment is shown in FIG. 5.

Figure 6:
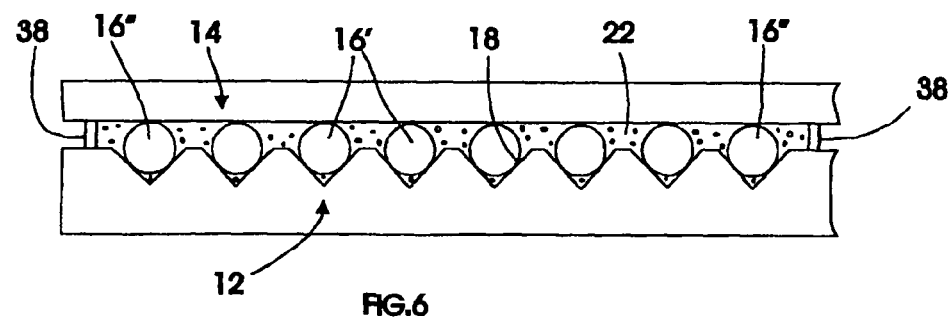
FIG. 6 is an enlarged end view of a fibre optic v-groove assembly utilizing upright dams to contain the low stress glue or potting compound, also in accordance with the present invention.

Another way of achieving symmetrical encapsulation for the fibres is shown in FIG. 6. In this embodiment, instead of additional v-grooves 24 being provided, as in FIG. 3, the substrate 12 is provided with a pair of upstanding walls or dams 38 outboard of and parallel to the curb fibres 16". The dams 38 would contain the low stress glue or potting compound 22 so that the curb fibres 16" would be encapsulated to the same degree as the inboard fibres 16', thereby achieving symmetrical stress levels for all of the fibres.

Figure 7:
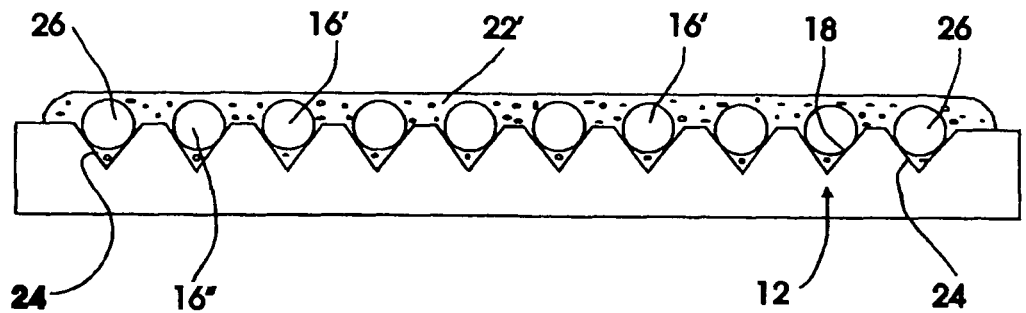
FIG. 7 is a view similar to that of FIG. 3 but without the use of a cover plate for the assembly.
Figure 8:
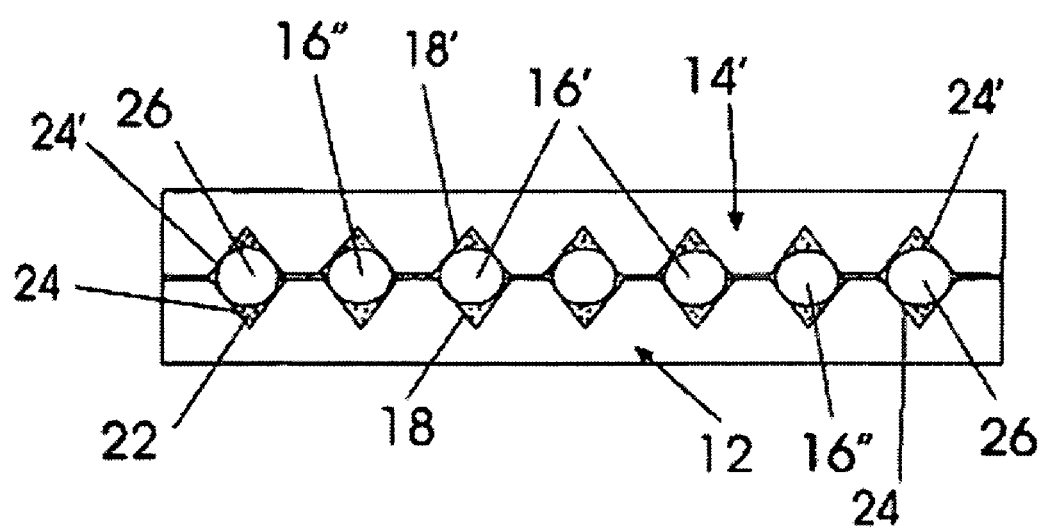
FIG. 8 is a view similar to that of FIG. 3 wherein the cover plate is provided with grooves corresponding to those of the substrate.

While the examples discussed above and shown in FIGS. 1–6 all are provided with a cover plate it should be understood that a cover plate is not an essential feature of the grooved assembly. As seen in FIG. 7, the glue or potting compound 22' can be laid or applied over the assembly of fibres 16', 16" and substrate 12 and allowed to cure without the benefit of dimensional constraints as provided by a cover plate. If a cover plate is provided, its lower surface need not be fully planar as shown in the drawings. The cover plate could have grooves in its lower surface corresponding to the grooves in the substrate for alignment with the fibres held in the substrate such that a portion of the glue or potting compound will be contained within the cover plate grooves, just as a portion is contained within the substrate grooves. This is shown in FIG. 8 wherein the cover plate 14' is provided with grooves 18', 24' corresponding to the grooves 18, 24 of the substrate 12. The grooves 18' of the cover align with the grooves 18 of the substrate and receive the portions of the operating inboard and curb fibres 16', 16" projecting above the substrate, while the additional grooves 24' of the cover plate align with the additional grooves 24 of the substrate and receive the portions of the non-operating or dummy fibres 26 projecting above the substrate.

Additionally, the benefits of the present invention are particularly advantageous when at least one of the operating fibres has polarizing or polarization maintaining properties. Not all of the operating fibres need be of this type. Depending on the application involved the other operating fibres could be single mode or multi-mode, for example.

The present invention identifies various means for achieving symmetrical stress levels for all operating fibres of a v-groove assembly. It is possible that skilled workmen could devise other means for achieving symmetrical stress levels for all fibres without departing from the spirit of the present invention and hence the protection to be afforded this invention is to be determined from the scope of the claims appended hereto.

The invention claimed is:

1. A fibre optic assembly comprising: a substrate having an upper surface and a plurality of equally spaced apart parallel grooves therein opening to said upper surface; a plurality of optical fibres with each such fibre being located in a corresponding one of said grooves with a portion of each fibre projecting above said upper surface; said plurality of optical fibres including at least one operating inboard fibre, a pair of operating curb fibres with one such curb fibre extending along each side of said at least one inboard fibre, at least one of said operating fibres having polarizing (PZ) or polarization maintaining (PM) properties; an additional groove extending alongside each of the grooves containing a curb fibre, outboard therefrom, and being spaced therefrom by a distance equal to the spacing of said parallel grooves; a non-operating fibre located in each of said additional grooves; and an encapsulating material encapsulating each of said operating and non-operating fibres within its respective groove, whereby said non-operating fibres serve to contain said encapsulating material such that said encapsulating material symmetrically surrounds all of said operating fibres.

2. The assembly of claim 1 wherein each said non-operating fibre has a diameter substantially the same as the diameter of the operating fibres.

3. The assembly of claim 1 wherein there are at least two operating inboard fibres.

4. The assembly of claim 1 wherein said grooves are of arbitrary profile, including v-shaped, elliptical, circular or rectangular.

5. The assembly of claim 1 wherein said grooves and fibres are provided in a plurality of arrays spaced from each other across said substrate, each such array having inboard and curb operating fibres and at least one pair of said additional grooves and non-operating fibres outboard of the curb fibres of the array.

6. The assembly of claim 1 including a cover plate positioned above said fibres and defining a space between itself and said upper surface, said encapsulating material being contained within said space.

7. The assembly of claim 6 wherein said cover has a lower surface facing said substrate, said lower surface including a plurality of equally spaced apart cover grooves therein, aligned with said grooves and said additional grooves of said substrate, said cover grooves receiving the portion of said operating and non-operating fibres projecting above said substrate.

8. A fibre optic assembly comprising: a substrate having an upper surface and at least one groove therein opening to said upper surface; a plurality of parallel optical fibres being located in said groove with a portion of each fibre projecting above said upper surface; said plurality of optical fibres including at least one operating inboard fibre, a pair of operating curb fibres with one such curb fibre extending along each side of said at least one inboard fibre, at least one of said operating fibres having polarizing (PZ) or polarization maintaining (PM) properties, and a pair of non-operating fibres with one such non-operating fibre located in said groove and extending alongside each of said curb fibres outboard thereof; and an encapsulating material encapsulating each of said fibres within said groove, whereby said non-operating fibres serve to contain said encapsulating material such that said encapsulating material symmetrically surrounds all of said operating fibres.

9. The assembly of claim 8 including a cover plate positioned above said fibres and defining a space between itself and said upper surface, said encapsulating material being contained within said space.

10. The assembly of claim 9 wherein said cover has a lower surface facing said substrate, said lower surface including a cover groove therein aligned with said groove of said substrate, said cover groove receiving the portion of said operating and non-operating fibres projecting above said surface.

* * * * *